350-96.24 SR

3/18/86 XR 4,577,197

United States Patent [19]

Crean et al.

[11] Patent Number: 4,577,197

[45] Date of Patent: Mar. 18, 1986

[54] INK JET PRINTER DROPLET HEIGHT SENSING CONTROL

[75] Inventors: Peter A. Crean, Penfield; David Birnbaum, Pittsford; David B. Feldman, Rochester, all of N.Y.; Frank J. Liptak, Carteret, N.J.; David W. Sewhuk, Rochester, N.Y.

[73] Assignee: Xerox Corporation, Stamford, Conn.

[21] Appl. No.: 692,260

[22] Filed: Jan. 17, 1985

[51] Int. Cl.[4] .................... G01D 15/18; H01J 5/16; G02B 6/04

[52] U.S. Cl. .................................... 346/75; 250/227; 350/96.24

[58] Field of Search ............ 346/75, 140 R; 250/227; 350/96.21, 96.24

[56] References Cited

U.S. PATENT DOCUMENTS

| | | | |
|---|---|---|---|
| 3,465,350 | 9/1969 | Keur et al. | 346/75 |
| 3,465,351 | 9/1969 | Keur et al. | 346/75 |
| 3,555,558 | 1/1971 | Sherman | 346/75 |
| 3,737,914 | 6/1973 | Hertz | 346/75 |
| 3,769,630 | 10/1973 | Hill et al. | 346/75 |
| 3,828,354 | 8/1974 | Hilton | 346/1 |
| 3,886,564 | 5/1975 | Naylor, III et al. | 346/75 |
| 3,992,713 | 11/1976 | Carmichael et al. | 346/75 |
| 4,050,075 | 9/1977 | Hertz et al. | 346/75 |
| 4,063,253 | 12/1977 | Ito et al. | 346/75 |
| 4,136,345 | 1/1979 | Neville et al. | 346/75 |
| 4,178,595 | 12/1979 | Jinnai et al. | 346/140 R |
| 4,249,076 | 2/1981 | Bergstrom et al. | 250/227 |
| 4,255,754 | 3/1981 | Crean et al. | 346/75 |
| 4,293,863 | 10/1981 | Davis et al. | 346/75 |
| 4,313,684 | 2/1982 | Tazaki et al. | 400/322 |
| 4,328,504 | 5/1982 | Weber et al. | 346/75 |
| 4,333,083 | 6/1982 | Aldridge | 346/1.1 |

*Primary Examiner*—E. A. Goldberg
*Assistant Examiner*—Gerald E. Preston
*Attorney, Agent, or Firm*—Robert A. Chittum

[57] ABSTRACT

A ink jet printer having a reciprocating printhead with a single jet to print full pages of information on a recording medium by printing contiguous swaths of information. The recording medium is stepped a distance of one swath height after each swath is printed. A height control sensor is located on one side of the recording medium to receive periodically one or more sweeps of test droplets. The height control sensor has upper and lower pairs of photodetectors to detect droplets passing thereby and to produce differential sensing signals which identify the droplet having a trajectory closest to the desired trajectory. By determining the number of droplets between the identified droplets, the interdroplet spacing and drift of the droplet trajectories is monitored. In response to the height control sensor signals, the printer controller with associated circuitry adjusts the operating parameters of the printer to correct and to maintain the desired droplet trajectories and interdroplet spacings.

8 Claims, 3 Drawing Figures

INK JET PRINTER DROPLET HEIGHT SENSING CONTROL

BACKGROUND OF THE INVENTION

1. Field of the Invention

The present invention relates to ink jet printing and, more particularly, to an ink jet printer having a single reciprocating jet which concurrently sweeps droplets in a direction perpendicular to the jet reciprocating direction while the jet reciprocates to print full pages of information one swath at a time. The ink jet printer has a height control sensor for maintaining predetermined spacing between swaths of printed information.

2. Description of the Prior Art

U.S. Pat. Nos. 3,465,350 and 3,465,351 to R. I. Keur et al. and U.S. Pat. No. 3,555,558 to Sherman disclose ink droplet printing devices in which an ink nozzle is moved perpnedicularly to the movement of web. Ink droplet placement is controlled by an electric field and unnecessary drops are deflected to a waste reservoir. Circuitry is provided to ensure that the droplets are charged in phase with data or video signals and that carriage motion variables are connected to ensure a uniform margin.

U.S. Pat. No. 3,737,914 to Hertz discloses a multi-jet printer whose printing head is moved from side-to-side, while the recording mechanism is moved in a direction perpendicular to that of the head movement. U.S. Pat. No. 4,050,075 to Hertz et al. discloses an ink jet writing system mounted on a travelling carriage, the carriage and recording medium being selectively moved to effect relative movement between them.

U.S. Pat. No. 4,178,595 to Jinnai et al. and U.S. Pat. No. 4,313,684 to Tazaki et al. disclose ink jet printers with oscillating print heads but are of the type which use drops-on-demand rather than print heads which emit continuous streams of ink that are concurrently broken into droplets and charged for deflection by an electrostatic field to the proper location on a receiving surface or to a gutter for recirculation.

U.S. Pat. No. 4,293,863 to Davis et al. discloses a printing device having an oscillating print head with a plurality of ink emitting nozzles and a recording medium that is mounted on a rotatable drum. The printing head is moved in either direction at a uniform velocity parallel to the area of rotation of the drum, thus printing along helical print lines or the print head may be moved a discrete distance after each rotation of the drum such that the print lines are circumferential. Several revolutions of the drum are necessary to print a line of complete fonts.

U.S. Pat. No. 3,769,630 to J. D. Hill et al. discloses an ink jet system wherein the droplets not required for printing are directed to a first gutter where the charges on the collected droplets develop a current that is sensed in an electronic feedback loop for sysnchronization of the droplet formation with droplet charging. An auxilliary gutter is positioned to receive droplets during a checking interval when a relatively high charge is applied to the unused droplets.

U.S. Pat. No. 4,255,754 to P. A. Crean et al. discloses the use of paired photodetectors to sense ink drops, one each for two output fibers, that are used to generate an electrical zero crossing signal. The zero crossing signal is used to indicate alignment or misalignment of a drop relative to the bisector of the distance between two output fibers. The sensor of this patent employs one input optical fiber and at least two output optical fibers. The free ends of the fibers are spaced a small distance from each other; the free end of the input fiber is on one side of the flight path of the drops and the free ends of the output fibers are on the opposite side. The remote end of the input fiber is coupled to a light source, such as an infrared light emitting diode (LED). The remote ends of each output fiber are coupled to separate photodetectors such as, for example, a photodiode responsive to infrared radiation. The ink is substantially a dye dissolved in water and is, of course, transparent to the infrared, thus reducing the problems of contamination usually associated with ink drop sensors. The photodiodes are coupled to differential amplifiers, so that the output of the amplifiers are measurements of the location of drops relative to the bisector of the distance between the output fiber ends confronting their associated input fibers and drops passing therebetween. Amplifier outputs are used in servo loops to position subsequently generated drops to the bisector location. The zero crossing may be used, depending upon its orientation with respect to the drop stream direction, as a time reference to measure the velocity of the drop. Therefore, the drop velocity information may be used in a servo loop to achieve a desired velocity.

The sensor of this invention uses a sensor similar to the one in U.S. Pat. No. 4,255,754, though the use and purpose is different, and the disclosure of this patent is incorporated by reference herein.

U.S. Pat. No. 3,886,564 to H. E. Naylor et al. discloses the use of differentially sensed, capacitive sensors to determine when a drop passing therebetween is equally distant therefrom, and such a sensor may be used to determine height and placement of drops in an ink stream.

U.S. Pat. No. 3,992,713 to J. M. Carmichael et al. discloses a sensor for synchronizing the drop break-off time to the charge applied by the charge electrode by using a pedestal voltage level rather than by referencing the charge level to zero, thus enabling the charge pulses to reach the required levels more quickly and accurately. This synchronizing sensor is located to one side of the carriage printer.

U.S. Pat. No. 4,063,253 to S. Ito et al. discloses a sensor and circuitry to detect ink drops for a predetermined time period and indicating improper operation if this should occur. The disorder sensed in the recording operation may be indicated by energizing a light or stopping the recording.

U.S. Pat. No. 4,136,345 to M. H. Neville et al discloses the placement of several spaced apart serially arranged sensors which are positioned in a sensing plane parallel to the deflection plane of the ink drops. One of the sensors is positioned for sensing ink drops after deflection. Timing means are connected to the sensors to compare the time of occurrence of a drop sensed between two sensors and a third one to indicate whether the drop being sensed is high or low relative to a predetermined optimum height of the drop.

U.S. Pat. No. 4,328,504 to H. Weber et al. discloses a sensor and circuitry for sensing ink drops after impacting the recording medium and comparing the sensor signals to desired signals for correcting the printing.

U.S. Pat. No. 4,333,083 to S. F. Aldridge discloses a plurality of spaced conductive members on opposite sides of an ink jet stream and having an amplifier circuit connected thereto to develop an output signal in response to the passage of charged drops. The output signal is processed to measure flight time.

None of the above references optically sense one or more of the upper and lower droplets in one vertical column sweep of droplets that normally print horizontal swaths of information one swath at a time from a single reciprocating jet and, in response thereto, determine and compare the interdroplet spacing of the ink droplets to a desired spacing. Any difference between the determined spacing and the desired spacing is indicative of correction required. At least one of the printer operating parameters is adjusted to maintain the correct interdroplet spacing for proper stitching between the printed and subsequently printed swaths based on the comparison.

SUMMARY OF THE INVENTION

It is the object of this invention to provide full page printing capability, from a single, continuous ink jet stream which is deflected in a direction perpendicular to the reciprocating direction of the jet stream to print swaths of information one swath at a time until a complete page of information is obtained.

It is another object of the invention to monitor periodically the trajectories of the ink droplets in a columnar sweep of ink droplets that are directed to the respective upper and lower pixels in the desired swath height and to correct the interdroplet spacing based upon the status of the monitored droplets.

It is a further object of this invention to monitor the interdroplet spacing of a columnar test sweep of droplets and to adjust the printer operating parameters, generally the drop generator pressure, to obtain a desired spacing between printed droplets on the recording medium, so that the upper droplets printed in a subsequent swath of information are contiguous with the lower printed droplets of the previously printed swath of information and without overlap or space, thus maintaining a high quality printed page of information.

In accordance with the present invention, a height control sensor is positioned adjacent one end of a platen holding a recording medium, such as paper, to sense a sweep of droplets before or after a swath of information is printed on the paper. A mounting structure fixedly attached to the stationary base of the ink jet printer has an elongated opening therein for the passage of a sweep of test droplets. A gutter to receive the sweep of test droplets is fixedly mounted to the printer base behind the mounting structure opening. First and second pairs of photodetectors are mounted at predetermined locations on the mounting structure adjacent one elongated edge of the opening therein. Each photodetector pair having an associated light source mounted on the mounting structure opening opposite the elongated edge having the photodetectors, so that the light sources confront and activate their associated photodetector pair. The charging status of each droplet in the sweep of test droplets are sequentially stored in a memory unit of the ink jet printer controller. When the upper and lower droplets are differentially sensed and identified by the photodetector pairs, the quantity of droplets therebetween and consequently the interdroplet spacing may be determined and adjusted.

In another embodiment, separate sequential bursts of droplets are directed to vertically fanned, overlapping pixel targets in a gutter and past the upper and lower photodetector pairs of the height control sensor. This causes an increase number of droplets to past each photodetector pair with the result that several droplets are detected by each photodetector pairs. The photodetector pairs, through differential sensing, produce signals from which the droplet having a trajectory closest to the desired one is determined and identified from a history or log table stored in the memory of the printer's controller.

At the end of each printed swath, at predetermined times, or after predetermined numbers of printed swaths, the printhead is moved beyond its normal reciprocating print width to a location in alignment with the height control sensor and associated gutter for a check on the interdroplet spacing of the vertically swept droplets. This check or calibration is required since the droplet trajectories tend to drift during operation, for example, due to pressure fluctuations in the droplet generator of the printhead.

The controller receives signals from the control sensor via associated circuitry from which the controller uses to adjust one of the operating parameters of the printer to place the droplets in their correct trajectories and thus maintain the proper interdroplet spacings. Generally, the parameter adjusted is the droplet generator pressure which gradually decreases because of minute system pressure losses through seals and the like.

The present invention overcomes the complex sensing devices and circuitries and, in many cases, varying degrees of inaccuracy caused by weak field intensities sensed by capacitive sensors of the prior art ink jet printers by providing highly accurate, differential sensing photodetector pairs which identify the trajectories of droplets in a columnar sweep of test droplets passing thereby and locates them in a sequentially established history or log table whereby the total number of droplets determined is directly related to the interdroplet spacing which may be corrected by adjusting the operating parameters of the ink jet printer, thus correcting for the normal drift of the droplet trajectories.

The foregoing features and other objects will become apparent from a reading of the following specification in connection with the drawings.

DESCRIPTION OF THE PREFERRED EMBODIMENT

Figure 1:
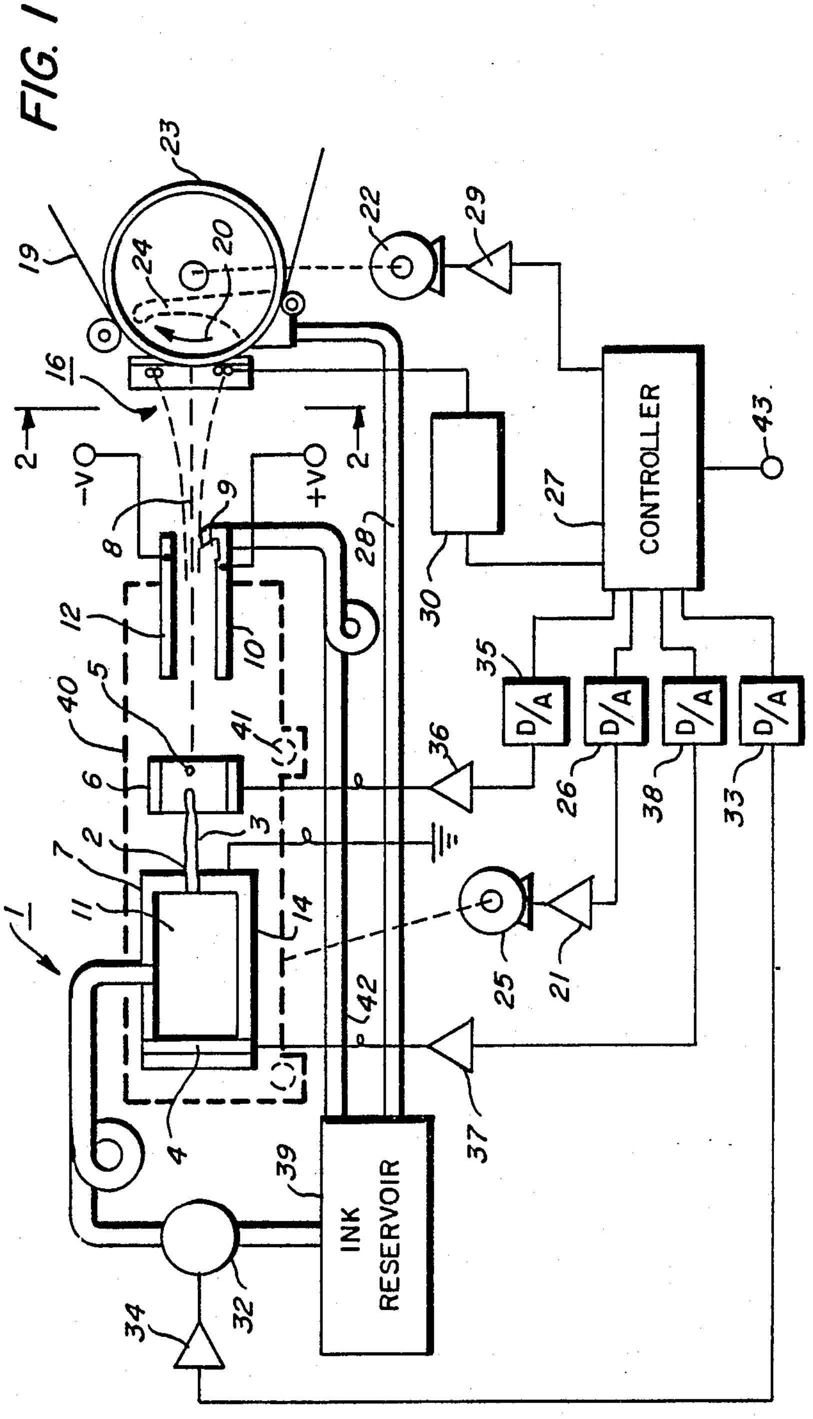
FIG. 1 is a side elevation view in schematic form of a single, continuous stream type ink jet printer having a reciprocating droplet generator and a height control sensor according to the present invention.

The pictorial ink jet printer of FIG. 1 includes a reciprocating printhead 1 shown in dashed lines which comprises a droplet generator 14 with a grounded ink manifold 7 having a single nozzle 2 through which fluid ink 11 is emitted under pressure creating a continuous stream 3 of the ink from the nozzle. A piezoelectric device 4 coupled to a wall of the manifold 7 periodically stimulates the ink with a pressure wave which promotes the formation of droplets 5 adjacent a charging electrode 6. The ink is conductive, so that voltage applied to the charging electrode at the moment of drop formation, results in a droplet 5 having a charge proportional to the applied voltage.

The charged droplets are deflected by deflection plates 10 and 12 in the plane of FIG. 1 or in the direction of periodic stepped movement of the recording medium 19 as depicted by arrow 20. The deflection plates 10, 12 have a high electrostatic field between them established by + and − voltage potentials. Typically, the charging voltages applied to charging electrode 6 are in the range of 10 to 200 volts, while the potential difference between the deflection plates 10, 12 is in the vicinity of 2000–3000 volts. The droplets not directed to the recording medium are directed to gutter 9 in deflection plate 10. The gutter directed droplets may be charged or uncharged, as a design choice, but in the preferred embodiment of FIG. 1, the uncharged droplets follow the straight line trajectory 8 to the recording medium.

A height control sensor 16 is located adjacent one end of an elongated platen 23 as more fully described later with respect to FIGS. 2 and 3. The height control sensor operates in a servo loop with the droplet generator controls to adjust the spacing of droplets 5 which are swept or fanned in a vertical direction or columnar manner. The droplet vertical deflection process is substantially linear and the droplets are substantially evenly spaced, so that the droplets can be positioned accurately within its vertical range to all droplet target areas on the recording medium, hereinafter referred to as pixels 13. See FIG. 2. In the preferred embodiment, the vertical height of the droplet deflection is that number of pixels required to print a selected character or font.

Figure 2:
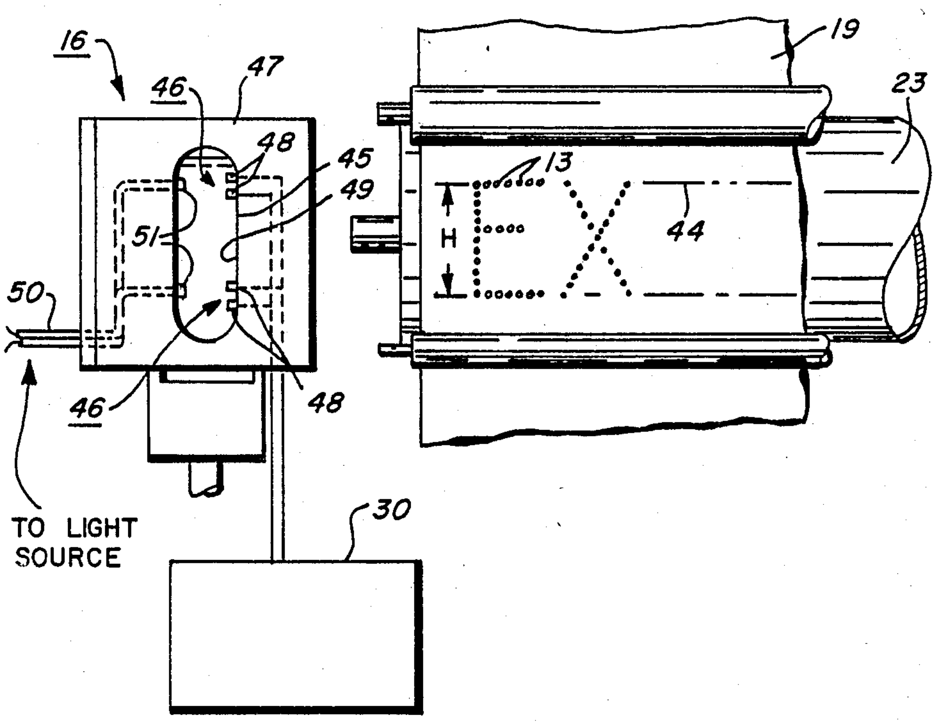
FIG. 2 is a front view of the portion of the ink jet printer as viewed along section 2—2 of FIG. 1.
Figure 3:
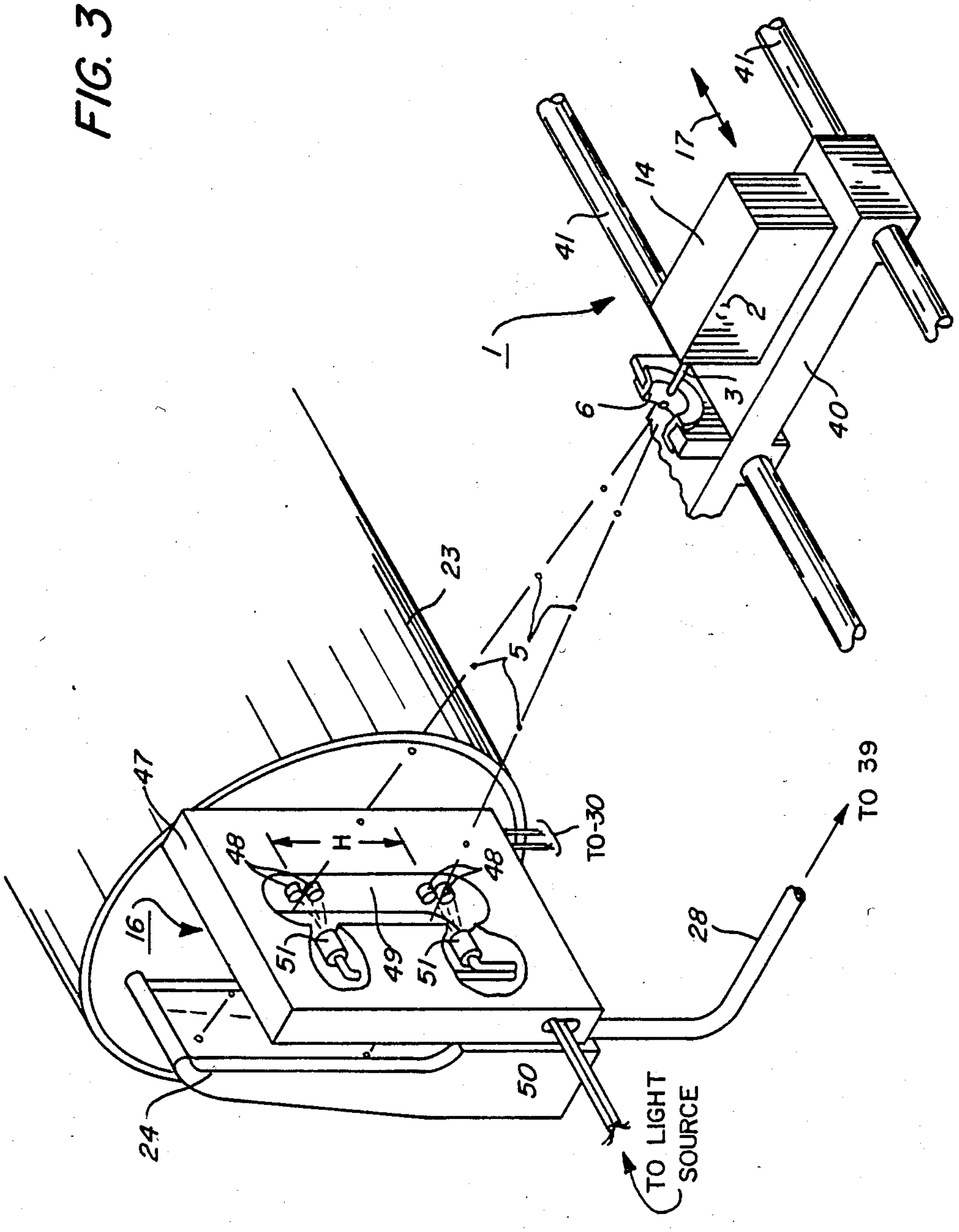
FIG. 3 is an enlarged, partial perspective view of the ink jet printer of FIG. 1 showing the height control sensor.

Referring to FIGS. 2 and 3, the charged droplets 5 from nozzle 2 form a vertical trace height or deflection bandwidth "H" at the printing plane of the recording medium. For illustrating purposes, this height is composed of a column of twelve droplets or pixels.

The printhead 1 has a droplet generator 14 with a single nozzle 2 and is mounted on a movable carriage 40 and adapted for reciprocal movement by means well known in the art such as slide rails 41. Reciprocating traversal of the platen 23 by the printhead is accomplished by drive means 25 in response to signals from the controller 27 through digital to analog (D/A) converter 26 and amplifier 21. Refer to FIG. 1. The reciprocating droplet generator's nozzle is aimed towards the recording medium. The direction of reciprocation is depicted by arrow 17 (FIG. 3), which direction is parallel to the platen and the portion of the recording medium thereon which is to receive the ink droplets. The drop generator is generally positioned on one end of the platen when not printing, and traverses back and forth adjacent the recording medium on the platen, printing in both directions during the printing mode. At the end of some or each traversal, the droplet generator proceeds a relatively short distance beyond the end of the platen to the height sensor 16 where one or more columnar sweeps of test drops are sensed.

During the traversal across the recording medium, the single stream of droplets are continually swept in a direction perpendicular to the traversal direction for a height "H," so that a stripe or swath of information having height "H" may be printed, one swath at a time, until a full page of information is recorded. At the end of each printed swath and/or during the sensing of a test sweep of droplets, the platen is stepped in a direction perpendicular to the droplet generator reciprocating direction for a distance of one swath height of "H" distance.

The droplet generator, charging electrode and deflection plates are all mounted on the carriage 40 to form the printhead of the ink jet printer. In FIG. 3, a portion of the printhead is omitted and the charging electrode is partially omitted for clarity of operation of the height control sensor 16.

The ink jet printer is designed to record information on an incrementally movable recording medium, which is held stationary during the printing of a swath of information then stepped the distance of one swath prior to the printing of the next swath of information.

The system of FIG. 1 makes black marks on the recording medium, for example, white paper, in response to electrical information signals. The information or video signals are applied to the controller 27 which is a microprocessor such as, for example, the model 6800 sold by the Motorola Corporation. Video signals representative of an image are stored, for example, in designated memory locations within the controller.

The controller also includes output ports that issue electrical control signals to the various system components. Amplifier 29 couples the controller to the recording medium stepper motor 22. Under the direction of the controller, the recording medium is stepped an incremental distance "H" at the end of each traversal by the printing head or droplet generator.

Except when the printhead is not printing or is having its calibration checked, the ink droplets are directed to the recording medium or to the gutter 9, depending whether, during the traversal of the droplet generator, the droplets are required for printing at specific pixel locations or not.

The controller 27 also includes an output to drive the piezoelectric device 4 that promotes the droplet formation. The piezoelectric device is driven at a frequency that gives rise to droplet generation rates typically in the vicinity of 100 to 150 kilohertz (KHz). The amplifier 37 and D/A converter 38 couple the piezoelectric device and the controller together.

A flexible conduit 42 connects the gutter 9 to the ink reservoir 39 to permit the unused ink to be recycled. Another conduit 28 connects the gutter 24, used for the collection of the sweep of test ink droplets or a known proportion thereof, to the ink reservoir for recycling the ink received by this gutter. The trajectories to the upper and lowermost pixels in the columnar sweep of pixels is diagrammatically depicted by dashed lines to show the vertical deflection of the droplets as they are directed to the recording medium in FIG. 1 and to the gutter 24 in FIG. 3, when the printhead is in the test position. The droplets not targeted for the recording medium during the printing of the swath of information are, of course, directed to gutter 9.

The controller 27, in response to receipt of digitized data signals at its input terminal 43, applies the charging voltage to the charging electrode 6 via D/A converter 35 and amplifier 36 by means well known in the art to convert video or digitized data signals to droplet charge signals and to compensate concurrently the charge signals for aerodynamic and electrostatic effects. Refer to, for example, U.S. Pat. No. 3,828,354 to Hilton.

In FIGS. 2 and 3, the height control sensor 16 is optionally placed at one end or the other of the platen 23 and positioned to receive a columnar sweep of test droplets or predetermined portion thereof from the printhead. The height control sensor is aligned with the swath 44, shown in dashed line, having printed information or to have information printed therein, so that the only movement necessary by the printhead to position itself for emitting the sweep of test droplets or a portion of the sweep of droplets is a periodic extension of its normal printing movement (see arrow 17 in FIG. 3) a short distant to align the nozzle with the height control sensor target or opening 45.

A pair of droplet sensors 46, similar to those described in U.S. Pat. No. 4,255,754 to Crean et al. and incorporated herein by reference, are placed in the printing plane of that portion of the recording medium 19 targeted to receive a single swath of printing. The pair of sensors 46 are mounted on a mounting structure 47 which is fixedly attached to the stationary printer base (not shown). The mounting structure has an elongated opening 45 oriented to have a vertical or columnar sweep of test droplets pass therethrough. A gutter 24 is fixedly positioned downstream from height control sensor to receive the sensed test droplets for collection and return to the ink reservoir 39 by conduit 28.

Each pair of sensors 46 have a pair of photodetectors 48 fixedly mounted at predetermined positions adjacent a one of the elongated edges 49 to sense and determine the uppermost droplet and the lowermost droplet used in the columnar sweep of test sweep of droplets or predetermined portion thereof that pass through the opening 45. Optical fibers 50 are mounted on the mounting structure with their ends 51 adjacent the elongated opening edge opposite the one having the droplet sensors 46 and confronting the pairs of photodetectors.

In FIG. 3, the charging electrode 6 is partially removed and the deflection plates 10, 12 are omitted for clarity to better show the trajectories of the uppermost and lowermost droplets 5 that are shown in dashed line through the height control sensor 16 and into gutter 24. The difference in the upper and lower droplets as they pass the pairs of photodetectors 48 is the height of the swath 44 of information printed or to be printed and is indicated as "H."

In one calibration mode, a sequence or sweep of test droplets may be thrown past the height control sensor 16 and the location of the droplets that pass at the centerline between each pair of photodetectors 48 are identified by circuitry 30 and recorded in a memory unit of the controller 27 as the upper and lower droplets in the printing bandwidth "H."

In another calibration mode, a test sweep of droplets for the entire swath height is not required. Instead, separate sequential bursts or sweeps of droplets are directed to the vicinity of the upper and lower pixel of the swath height "H." Each burst of test droplets are directed to columns of overlapping pixel targets in the plane of the swath printed or to be printed on the recording medium. The burst of sequentially generated test droplets may be directed past either the upper or the lower drop sensor 46 first, then directed past the other one. Each burst of droplets must have in trajectories which encompass or include in its range of trajectories, the desired droplet trajectory which would direct a droplet to first the upper pixel in the swath then the lower pixel or visa versa. In this manner, the closest droplet trajectory to the desired trajectory is identified and, via the sensor circuitry 30 and controller 27, the voltage of the droplet following that trajectory is identified. Since each calibration droplet characteristic, including its charge quantity, is stored in the memory unit of the controller 27, the controller automatically adjusts the printer operating parameters to maintain the desired upper and lower droplet trajectories of the printing sweep of droplets. Although many parameters of the printer may drift out of tolerance, they may be compensated for by varying the drop generator pressure, so that it is primarily the drop generator pressure that is adjusted in response to the signals generated by the sensor circuitry.

The sequence and voltage at time of droplet charging are some of the droplet characteristics of each test droplet that are temporarily stored in a history or log table in the memory unit of the controller. The upper and lower test droplets and their interspatial distances can be readily determined by the controller by means well known in the art. In one mode, the number of test droplets found by the controller to pass the height control sensor 16 is compared to the predetermined desired number of droplets and the information used to maintain or obtain the desired number of droplets per swath height "H." The number of droplets per swath height "H" is determined by one of several printhead parameters such as the droplet generator manifold pressure, ink stream stimulation frequency and the like. In the other mode, the droplets having the closest trajectories to the desired ones are identified and its log table status used to extrapolate the parameters of the droplet to achieve the desired trajectory. Thus, the controller maintains the correct interdroplet spacing per swath height by adjusting at least one of the ink jet printer parameters such as the charging voltage, deflection voltage, manifold pressure, etc. In the preferred embodiment, the controller maintains the correct interdroplet spacing per swath height "H" by increasing or decreasing the fluid pressure in the droplet generator manifold 7 by a servo controller pump 32. The signal from the controller 27 to the pump is via D/A converter 33 and amplifier 34.

Although the test sweep of droplets might be a simple sequential fan of droplets or two separate bursts of vertically fanned droplets that are directed past each droplet sensor 46 as described above, a more complex pattern could be used. The sweep of test droplets could be vertically fanned in such a manner to enable the pair of sensors 46 and sensor circuitry 30 to account for possible mechanical misalignment encountered in mounting the photodetectors 48 on the mounting structure 47 or the mounting of the mounting structure 47 on the printer base.

Because of the droplet sensing detection mechanism, the detection algorithm of the sensor circuitry 30 will not be affected by any overall motion of the height control sensor. In any case, the sensors 46 are provided with electronic circuitry 30 which determines whether any droplet passing the height control sensor 16 falls into one of three disjunct classes: not sensed, sensed high, or sensed low as well as identifying the ones passing the centerline between the pairs of photodetectors 48. The sensed high and sensed low refer to the high and low sides of each sensor 46. The controller 27 utilizes this information to build the history table showing the status of each droplet thrown. The desired control of the number of droplets per swath height is provided by a straight forward algorithm for use by the controller in analyzing the history table generated and enabling the adjustment of the droplet generator manifold pressure accordingly. A variety of compensation algorithms which are familiar to those skilled in the art can be prepared and used to adjust the manifold pressure to account for system pressure losses as well as to print swaths with higher or lower heights.

The circuitry 30 amplifies signals from the sensor and directs the amplified signals into a comparator included therein which is triggered one way if the sensed-high signal is larger than the sensed-low signal and is triggered the other way, if the sensed-low signal is larger. This information is encoded along with a droplet detect signal generated when a droplet passes the bisector location between a pair of photodectors 48 and the two signals are read by the controller 27. The presence of the two signals are used by the controller to decide if a droplet 5 was detected and, if so, on which side of the pair of photodetectors (or whether it was exactly in the center between them) it was on. Since the deflecting electrodes 10, 12 deflect only one droplet at a time and the charging electrode 6 charges only one droplet at a time, the controller 27 may make an individual decision on each subsequent droplet produced by the droplet generator. Although these parameters may be adjusted, the preferred embodiment utilizes the height control sensor to adjust the pressure in the ink manifold 7 to maintain the appropriate upper and lower droplet trajectories to cause the droplets to impact the appropriate upper and lower pixels on each swath height. Thus, the desired number of droplets or interdroplet spacing for the swath height to be printed by the reciprocating, single nozzle printhead is maintained by adjusting the droplet generator manifold pressure. By increasing or decreasing the droplet velocities through manifold pressure adjustment, a larger or small number of droplets may be swept or fanned through the sweep height of the swath to be printed. Since the controller 27 can utilize the fact that there is a known time window during which the first droplet in a test sweep should be detected, the height control sensor 16 may be disabled until this window starts, thus reducing the probability of misleading signals from the everpresent electronic noise.

One of the principal advantages of the height control sensor of this invention is the high degree of accuracy achieved by the two pairs of photodetectors 48, since this configuration is not affected by mechanical shifts in the sensor or by changes of the gain or offset of the electric circuitry. A flaw in many prior art systems is that they use only a single sensor. Finally, the use of a pair of sensors (i.e., two sensors having a pair of photodetectors each) makes the installation replacement or adjustment of the height control sensor a relatively simple process with large tolerances.

In recapitulation, the present invention utilizes a height control sensor having two pair of photodetectors to sense a columnar sequence or sweep of droplets or predetermined portions thereof from a reciprocating printhead emitting a single stream of ink droplets in order to identify the droplets having trajectories closest to the desired trajectories that direct them to the upper and lowermost pixels in a printed swath. A controller determines the total number of droplets in the sweep between the identified upper and lower droplets from a history table generated in a memory unit therein and compares the actual number of droplets in the column of droplets between each pair of photodetectors against a desired number of droplets. A signal is generated by the ink jet printer controller in response to the comparison of the sweep of test droplets to the desired number of droplets to adjust a parameter of the ink jet printer, such as its stream pressure to increase droplet velocity as necessary to maintain the appropriate number of ink droplets per swath of information to be printed and to ensure that the individual swaths remain of constant height. In another embodiment, separate bursts of sequentially generated test droplets are fanned by each of the upper and lower droplet sensors. The test droplets may be directed to overlapping pixel targets. The droplet parameters of the closest droplet sensed by the upper and lower droplet sensors is used to adjust the droplet trajectories aimed for the upper and lower pixels in a swath of information to be printed and is used to establish vertical interdroplet spacings in the swath. A constant print height provides a high quality image without gaps or overlaps between the individual adjacent swaths of printed information which collectively make up a full page of information.

Many modifications and variations are apparent from the foregoing description of the invention and all such modifications and variations are intended to be within the scope of the present invention.

We claim:

1. An improved ink jet printer of the type having a stationary base and a reciprocating printhead mounted on a movable carriage, the printhead having a droplet generator with a single nozzle for producing a single perturbated, continuous stream of ink under pressure that breaks up into droplets at a predetermined distance from the nozzle whereat the droplets are charged in accordance with digitized data signals from a controller for printing swaths of information on a recording medium by sweeping a predetermined series of droplets in one direction, while the droplet generator is reciprocated in another direction, and repeating the carriage reciprocation and droplet sweeping until a completed page of information is printed one swath at a time, the recording medium being incrementally moved a distance equal to the height of one printed swath by a platen after each swath is printed, wherein the improvement comprises:

a height control sensor positioned adjacent at least one end of the platen at a location to sense periodically a test sweep of droplets before or after a swath of information is printed, the sensor having:

(1) a mounting structure fixedly attached to the printer base with an opening therein for the passage of a test sweep of droplets therethrough, (2) first and second pairs of photodetectors fixedly mounted at predetermined positions on the mounting structure adjacent said opening therein, and (3) each photodetector pair having an associated light source fixedly mounted on the structure adjacent said opening therein at a location opposite its associated photodetector pair, so that the light sources confront and activate their associated pair of photodectors each of the photodetector pairs generating differential sensing signals in response to the passage of droplets thereby;

circuit means, responsive to said differential sensing signals, for identifying which of the droplets detected by each of the photodector pairs has a trajectory closest to a desired predetermined trajectory, the circuit means generating control signals indicative of whether the identified droplet has the desired trajectory or has one higher or lower; and means responsive to said control signals for adjusting at least one printer operating parameter in response to the control signals to correct the trajectories of the droplets and thus their interdroplet spacing, so that each subsequently printed swath on the recording medium has a uniformly constant height, thereby enabling the printer to incrementally move the recording medium so that each swath is contiguous to the previously printed swath without pixel gaps or overlaps because all swaths are substantially the same uniform height.

2. The ink jet printer of claim 1, wherein the adjusted printer parameter is the pressure in the droplet generator and said pressure is adjusted by a servo controlled pump in response to signals from said controller in response to the differential sensing signals from the height control sensor.

3. The ink jet printer of claim 1, wherein the adjusted printer parameter is the charging voltage applied to the droplets by a charging electrode and said charging voltage is increased or decreased in accordance with signals from said controller in response to the differential sensing signals from the height control sensor.

4. The ink jet printer of claim 1, wherein the adjusted printer parameters is a combination of the pressure in the droplet generator and the charging voltage applied tó the droplets by a charging electrode, the pressure being adjusted by a servo controlled pump and the applied charging voltage being increased or decreased in respone to signals received from said controller upon receipt of the differential sensing signals from the height control sensor.

5. The ink jet printer of claim 1, wherein the printer further comprises a gutter to receive the sensed sweep of droplets for collection thereof.

6. The ink jet printer of claim 1, wherein the height control sensor is disabled until the trajectories of the droplets passing therethrough approach those detectable by at least one of the pair of photodetectors in order to reduce electronic noise.

7. The ink jet printer of claim 1, wherein the test sweep of droplets comprise separate bursts of sequentially generated droplets which are fanned by each of the photodetector pairs.

8. The ink jet printer of claim 7, wherein te trajectories of the separate bursts of droplets are adjusted so that their interdroplet spacings are closer than that used for printing to insure that the photodetector pairs may sense more than one droplet.

* * * * *